United States Patent
Maran et al.

(10) Patent No.: US 10,576,664 B2
(45) Date of Patent: Mar. 3, 2020

(54) METHOD FOR CONTROLLING A MATERIALS HANDLING INSTALLATION WITH SECURING OF MEANS OF ACCESS FOR MAINTENANCE

(71) Applicant: SIDEL PARTICIPATIONS, Octeville-sur-Mer (FR)

(72) Inventors: Christophe Maran, Octeville-sur-Mer (FR); Laurent Danel, Octeville-sur-Mer (FR); Sebastien Moulin, Octeville-sur-Mer (FR); Fabian Petit, Octeville-sur-Mer (FR)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 69 days.

(21) Appl. No.: 15/730,310

(22) Filed: Oct. 11, 2017

(65) Prior Publication Data

US 2018/0099435 A1   Apr. 12, 2018

(30) Foreign Application Priority Data

Oct. 12, 2016 (FR) ...................... 16 59844

(51) Int. Cl.
| | |
|---|---|
| *G05B 11/01* | (2006.01) |
| *B29C 31/00* | (2006.01) |
| *F16P 3/08* | (2006.01) |
| *B29C 31/08* | (2006.01) |

(52) U.S. Cl.
CPC ............ *B29C 31/002* (2013.01); *B29C 31/08* (2013.01); *F16P 3/08* (2013.01)

(58) Field of Classification Search
CPC ....... B29C 31/002; B29C 31/08; B29C 49/42; B29C 49/78; F16P 3/08
See application file for complete search history.

(56) References Cited

U.S. PATENT DOCUMENTS

| | | | |
|---|---|---|---|
| 5,265,497 A | * | 11/1993 | Curless ..................... F16P 3/08 198/346.1 |
| 8,272,495 B2 | | 9/2012 | Zech |
| 9,737,909 B2 | | 8/2017 | Duclos et al. |

(Continued)

FOREIGN PATENT DOCUMENTS

| | | |
|---|---|---|
| DE | 10 2007 047 733 A1 | 4/2009 |
| EP | 0 940 343 A1 | 9/1999 |

(Continued)

OTHER PUBLICATIONS

French Search Report, dated Jun. 19, 2017, from corresponding FR application No. 1659844.

*Primary Examiner* — Zhipeng Wang (57) ABSTRACT

Disclosed is a method for controlling an installation for handling hollow bodies, which includes: a plurality of treatment units; a transfer system; and a covering including a frame that defines casings and door leaves each mounted on a casing; a control unit. Also included are steps of: detection by the control unit of the stopping of a treatment unit; detection by the control unit of the closed position of door leaves located in the vicinity of an interface between the detected treatment unit that is stopped and the transfer system; and if these door leaves are detected in closed position, ordering by the control unit of the locking of these door leaves.

11 Claims, 4 Drawing Sheets

(56) References Cited

U.S. PATENT DOCUMENTS

| | | | |
|---|---|---|---|
| 2007/0013236 A1* | 1/2007 | Fleiner | G01D 5/2066 307/326 |
| 2011/0083480 A1* | 4/2011 | Linger | E05B 47/0046 70/77 |
| 2011/0260372 A1* | 10/2011 | Hahn | B29C 49/42 264/500 |
| 2013/0020817 A1* | 1/2013 | Pullmann | E05B 15/022 292/341.17 |
| 2013/0211575 A1 | 8/2013 | Hahn | |
| 2015/0275551 A1* | 10/2015 | Rink | F16P 3/08 70/263 |
| 2016/0290559 A1* | 10/2016 | Nair | F16P 3/00 |
| 2018/0305160 A1* | 10/2018 | Rocca | B25J 9/1676 |

FOREIGN PATENT DOCUMENTS

| | | |
|---|---|---|
| EP | 2 077 919 A2 | 7/2009 |
| EP | 2 778 082 A1 | 9/2014 |
| FR | 2 907 351 A1 | 4/2008 |

\* cited by examiner

METHOD FOR CONTROLLING A MATERIALS HANDLING INSTALLATION WITH SECURING OF MEANS OF ACCESS FOR MAINTENANCE

The invention relates to controlling materials handling installations, and in particular installations for handling of hollow bodies, such as installations for producing containers from preforms of plastic material.

This type of installation comprises several treatment units that each perform at least one operation on the hollow bodies.

Thus, an installation for producing containers traditionally comprises:
- a unit for heat conditioning of the preforms, designed to heat the preforms by means of infrared sources to a temperature greater than the glass transition temperature of the material (in the case of polyethylene terephthalate or PET, whose glass transition temperature is about 80° C., the temperature for heating preforms is generally about 120° C.);
- a unit for forming the containers by blow molding or stretch blow molding of the hot preforms;
- optionally a unit for rinsing the containers thus formed;
- optionally a unit for plasma treatment of the formed containers;
- a unit for filling the formed (and optionally rinsed) containers with a product (for example, a beverage);
- a unit for capping the filled containers;
- a unit for labeling the capped containers.

The treatment units are mounted in series, and a transfer system ensures the transit of the preforms or of the containers from one to the next. Each transfer device ordinarily appears in the form of a wheel that is equipped, on its periphery, with clips that grab the preforms (or the containers) at the output of a given treatment unit and deliver them to the next treatment unit, beyond a circular arc-shaped path.

Such an installation is equipped with a control unit that guides the operation by controlling various parameters of production for the treatment units (for example, the radiating power of the sources in the heat conditioning unit or else the times for opening solenoid valves in the forming unit).

In operation, the movable parts of the treatment units and of the transfer system move at very high speed along a circular or linear path, depending on the structural design selected. Thus, a carousel of a forming unit or plasma treatment unit, with a diameter of about 5 m, equipped with 24 treatment stations and ensuring a rate of 55,000 containers per hour, rotates at a speed of 34 rpm, or, for each treatment station, a linear speed of about 10 m/s.

The means of access to the treatment units and to the transfer system while operating are therefore particularly dangerous for personnel. This is why this type of installation is equipped with a covering that defines a closed chamber in which the treatment units and the transfer system are housed.

Such a covering traditionally comprises a frame (for example tubular) that, in certain areas, defines casings, and door leaves mounted on these casings to, in a closed position, prohibit access to the chamber (particularly during the operation of the machine) and, in an open position, provide access, from the outside, to an area of the installation requiring maintenance actions.

To prevent an untimely opening during the operation of the machine, the covering is in general equipped, for each door leaf, with a system for locking the door leaf in closed position, typically in the form of a lock-and-key.

The locking can be remote-controlled, as described in the U.S. patent application US 2013/0211575 (Krones).

In certain installations, at least one of the treatment units can be stopped and disengaged from the transfer system while the other treatment units (and the transfer system) remain in operation.

Thus, in the installations that are suitable for the production of containers that undergo a plasma treatment to form an inner barrier layer (see, for example, the European patent application EP 2 077 919 in the name of Sidel Participations), the plasma treatment can be isolated from the rest of the installation, particularly when it must be used to produce containers without a barrier layer.

In this case, the down time of the plasma treatment unit can be used to ensure its maintenance. However, the maintenance operations are risky for the personnel, because of the proximity of the transfer system that remains operating and consequently represents a danger of injury.

Therefore, there is a need to secure the means of access to the materials handling installations.

For this purpose, firstly, a method for controlling a materials handling installation for hollow bodies is proposed, which comprises:
- a plurality of units for treating hollow bodies;
- a system for transferring hollow bodies between the treatment units;
- a covering that defines a closed chamber in which the treatment units and the transfer system are housed, this covering comprising:
  - a frame that defines casings;
  - door leaves each mounted on a casing between an open position in which the door leaf provides access to the chamber from the outside, and a closed position in which the door leaf prohibits access to the chamber from the outside;
  - for each door leaf, a system for locking the door leaf in closed position;
- a control unit;

this method comprising the following operations:
- detection by the control unit of the stopping of a treatment unit;
- detection by the control unit of the closed position of door leaves located in the vicinity of an interface between the detected treatment unit that is stopped and the transfer system;
- if these door leaves are detected in closed position, ordering by the control unit of the locking of these door leaves.

In this way, the personnel cannot access the junction areas between the stopped treatment unit and the transfer system, whose operation (and movement) continues. The result is an improved securing of the work areas around the treatment unit.

According to a particular embodiment, the control method further comprises the following operation:
- if a door leaf located in line with the detected treatment unit that is stopped and at a distance from an interface with the transfer system is detected as locked in closed position, unlocking of this door leaf.

The following operation can further be provided:
- generating an alert signal for locking for any locked door leaf.

According to an embodiment, the alert signal is manifested by the lighting of an indicator light in the vicinity of the door leaf that is locked in closed position.

Installation for handling of hollow bodies, which comprises a plurality of units for treating hollow bodies;
a system for transferring hollow bodies between the treatment units;
a covering that defines a closed chamber in which the treatment units and the transfer system are housed, this covering comprising:
a frame that defines casings;
door leaves each mounted on a casing between an open position in which the door leaf provides access to the chamber from the outside, and a closed position in which the door leaf prohibits access to the chamber from the outside;
for each door leaf, a system for locking the door leaf in closed position;
a control unit programmed for:
detecting the stopping of a treatment unit;
detecting the closed position of door leaves located in the vicinity of an interface between the detected treatment unit that is stopped and the transfer system;
if these door leaves are detected in closed position, ordering the locking of these door leaves.

According to a particular embodiment, the locking system comprises a proximity sensor or switch mounted on the casing and connected to the control unit.

The locking system comprises, for example, an electromechanical lock mounted on the casing and including:
a bolt that can be moved between a locking position in which it works with a catch carried by the door leaf, and a release position in which it is separated from the catch;
a mechanism for blocking the bolt in locking position, connected to the control unit and controlled by it.

Other objects and advantages of the invention will come to light in the description of an embodiment, made below with reference to the accompanying drawings in which.

Figure 1:
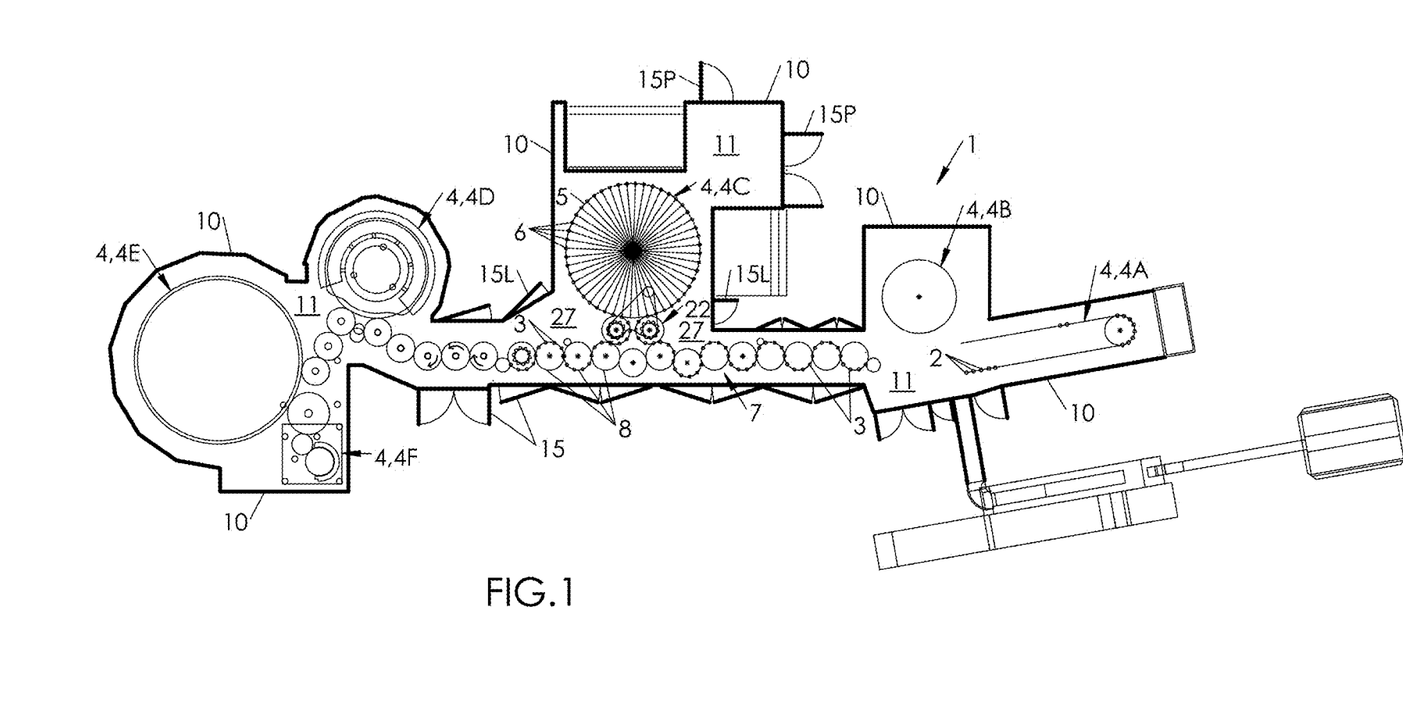
FIG. 1 is a diagrammatic top view of an installation for producing containers from preforms of plastic material.
Figure 2:
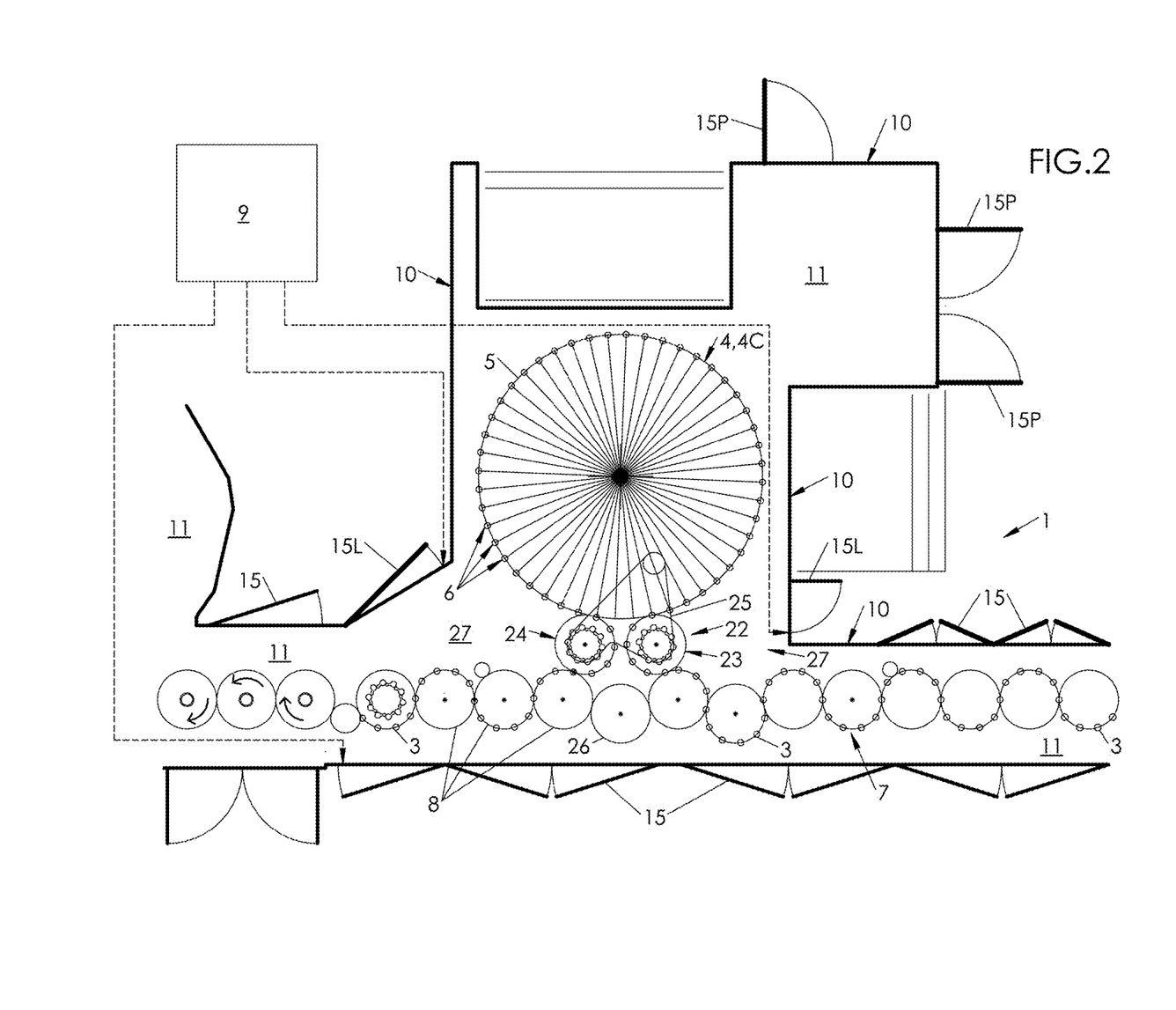
FIG. 2 is a detail view, on a larger scale, of the machine of FIG. 1, taken from insert 1.

Shown in FIG. 1 and FIG. 2 is an installation 1 for handling hollow bodies 2, 3 of plastic material. In particular, it can be a line for producing containers 3 from preforms 2 of plastic material, typically of polyethylene terephthalate (PET). The expression "hollow bodies" designates in this case either the preforms 2 or the containers 3 that are formed from them. The number and the positioning of the hollow bodies 2, 3 drawn in FIG. 1 and FIG. 2 have only an illustrative purpose and do not take into account either the scale or the capacity of the installation 1. In what follows, the terms "installation" and "line" are synonymous.

The installation 1 comprises, firstly, a plurality of units 4 for treating hollow bodies 2, 3, which each define for them a treatment path 5 that extends between an input point where the hollow bodies 2, 3 are introduced into the treatment unit 4 and an output point where the hollow bodies 2, 3 are removed from the treatment unit 4.

A typical line for producing containers 3 from preforms 2 comprises a series of treatment units 4 each provided to perform on the preforms 2 or the containers 3 a particular operation, namely:

a unit 4A for heat conditioning of the preforms 2 (also called a furnace), configured to bring the preforms 2 to a temperature greater than the glass transition temperature of the material (in the case of PET, whose glass transition temperature is about 80° C., the temperature for heating preforms is ordinarily about 120° C.); this heat conditioning unit 4A ordinarily comprises a series of infrared radiation sources (typically halogen lamps) in line with which the preforms 2 are transported in a stream, but it is possible to conceive of individual heating stations mounted on a wheel;

a unit 4B for forming the containers 3 by blow molding or stretch blow molding (also called a blower), which typically comprises a carousel and, mounted on it, a plurality of molds having the impression of the containers 3;

if necessary, a unit 4C for plasma treatment of the containers 3 to deposit on their inner wall a thin layer of carbon based material, forming an inner layer that is a barrier to air; this plasma treatment unit 4C comprises here a carousel 5 and a plurality of stations 6 for treating the containers 3 mounted on it;

a filling unit 4D (also called a filling machine) that typically comprises a carousel and, mounted on it, a plurality of valves for dispensing a product (particularly food-related, typically a beverage) into the containers 3;

a capping unit 4E (also called a bottle-capping machine), which comprises a carousel and, mounted on it, cap applicators to close the previously-filled containers 3 in an airtight manner;

a labeling unit 4F (also called a labeling machine) configured to apply on each filled and capped container 3 a label having informational value.

These treatment units 4 are mentioned by way of illustration and in a nonlimiting way. Other treatment units could be provided, such as a rinsing unit and a drying unit, inserted between the forming unit 4B and the filling unit 4D. Further, the order in which the treatment units 4A to 4F are indicated above must not be considered as limiting. Thus, the labeling unit 4F could be inserted between the forming unit 4B and the filling unit 4D.

The installation 1 comprises, secondly, a system 7 for transferring the hollow bodies 2, 3 between the treatment units 4. In the example illustrated, this transfer system 7 comprises a plurality of transfer wheels 8 mounted in series and defining a transfer path that connects the different treatment units 4.

In practice, each transfer wheel 8 carries, on its periphery, a series of gripping clips used to grab a hollow body (preform 2 or container 3) and to move it on an arc-shaped path from another transfer wheel 8 (or a treatment unit 4) located upstream, to still another transfer wheel 8 (or another treatment unit 4) located downstream. The arrows drawn at the bottom and to the left in FIG. 2 illustrate the direction of rotation of these transfer wheels 8.

The installation 1 comprises, thirdly, a computerized control unit 9 connected to at least some of the parts of the installation 1 and provided with programmed instructions to ensure an at least partial guiding of it. The control unit 9 can be programmed or monitored via a man-machine interface (such as a touch screen or a screen-keyboard console). The control unit 9 can thus, in a nonlimiting way, command/control/regulate:
- the synchronous driving of the treatment units 4 and the transfer system,
- the radiating power of the sources in the heat conditioning unit 4A,
- the opening and closing of solenoid valves for blow molding of the containers in the forming unit 4B,
- the opening and closing of solenoid valves for injection of a precursor gas into the plasma treatment unit 4C,
- the activation of the plasma by microwaves in the plasma treatment unit 4C.

The treatment units 4 and the transfer system 7 comprise numerous moving parts that, in operation, are dangerous and from which personnel must be kept at a distance.

For this purpose, the installation 1 comprises, thirdly, a covering 10 that defines a closed chamber 11 in which the treatment units 4 and the transfer system 7 are housed.

This covering 10 comprises a frame 12, which can be tubular and, for example, made by assembling aluminum profiles, as proposed by the ITEM company.

In certain parts, the covering 10 forms a support for stationary panels 13. In other parts, and particularly in line with the treatment units 4 and, at least locally, in line with the transfer system 7, the covering defines casings 14.

Figure 3:
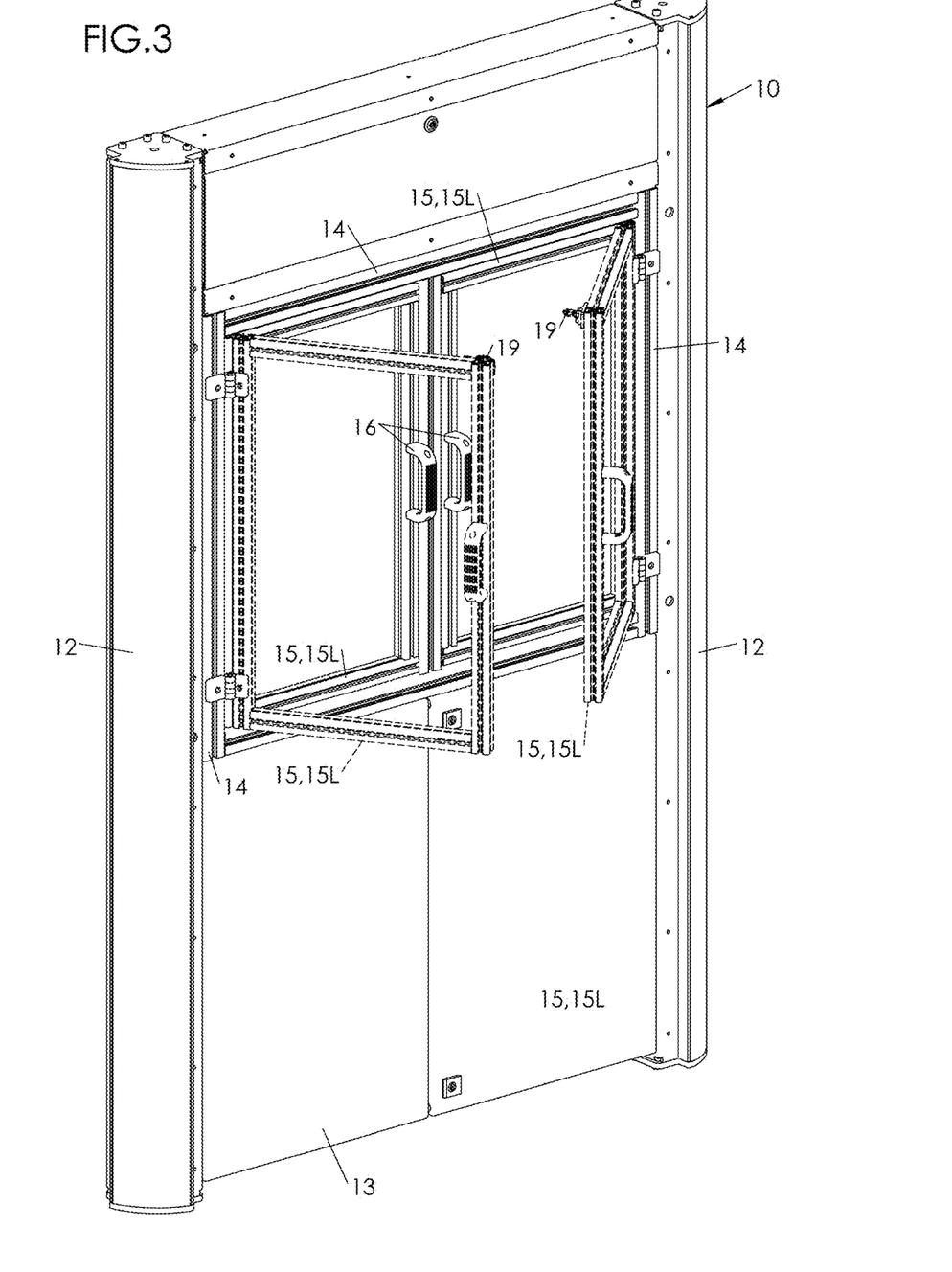
FIG. 3 is a view in perspective showing a portion of the covering of the machine with door leaves providing access to the chamber; two of the door leaves are shown in open position in dotted lines.
Figure 4:
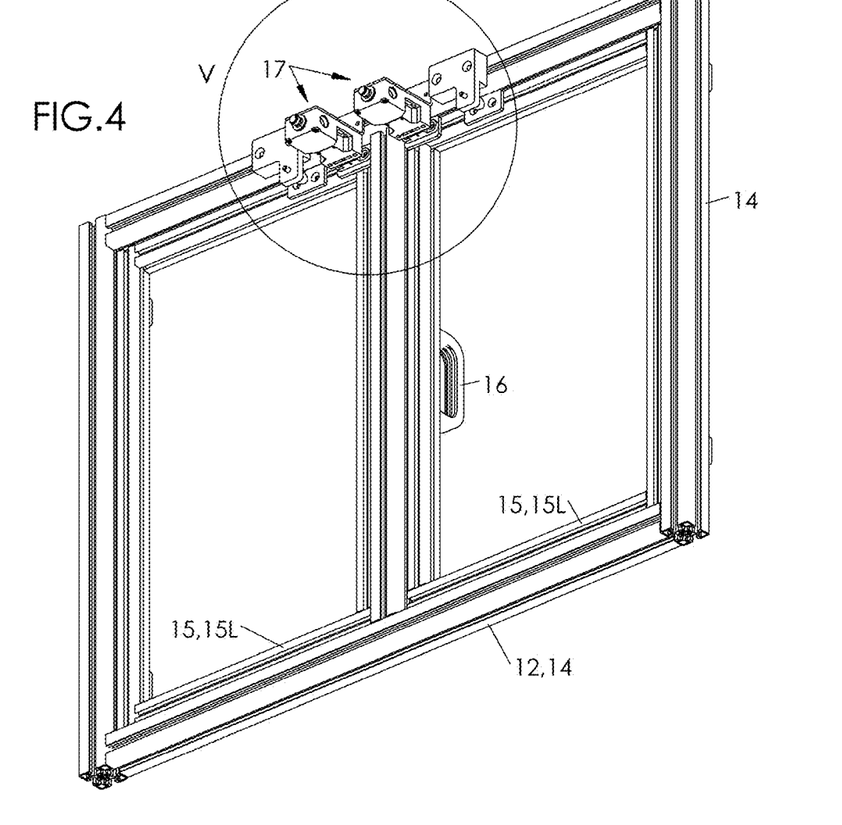
FIG. 4 is a view in perspective showing door leaves and a system for locking them in closed position.

The covering 10 furthermore comprises door leaves 15 (door or window) each mounted on a casing 14 between an open position (illustrated in dotted lines in FIG. 3) in which the door leaf 15 provides access to the chamber from the outside, and a closed position (in solid lines in FIG. 3) in which the door leaf 15 prohibits access to the chamber 11 from the outside. In FIG. 1 and FIG. 2, the door leaves have been shown diagrammatically in architectural drawings. In FIG. 3 and FIG. 4, modular door leaves 15 produced by assembling metal profiles have been shown. As is seen in these figures, each door leaf 15 advantageously has a handle 16 that makes possible its opening by hand.

The covering 10 further comprises, for each door leaf 15, a system 17 for locking the door leaf 15 in closed position.

Figure 5:
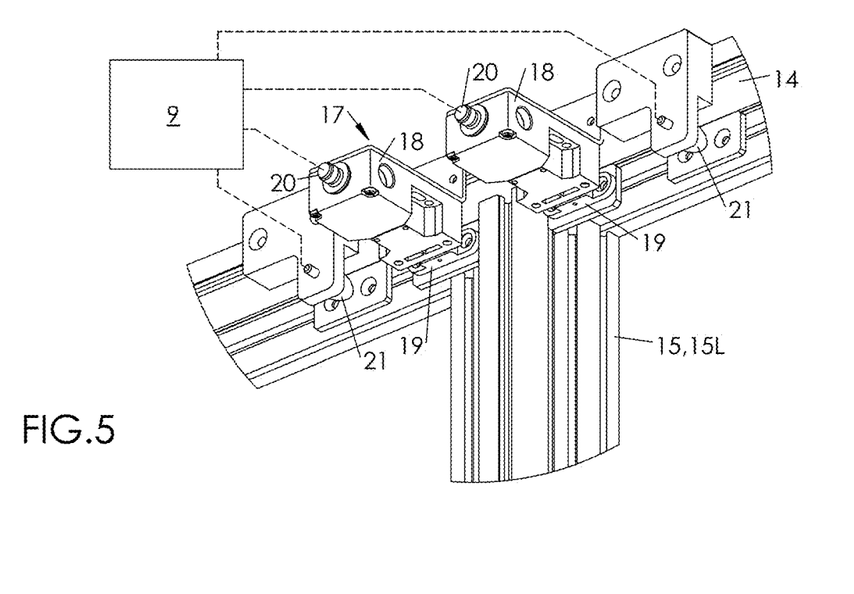
FIG. 5 is a detail view taken from the inset V of FIG. 4 and showing the locking system on a larger scale.

According to an embodiment illustrated in FIG. 4 and FIG. 5, this locking system 17 comprises an electromechanical lock 18 mounted on the casing 14 and including:
- a bolt that can be moved between a locking position in which it works by hooking with a catch 19 carried by the door leaf 15, and a release position in which it is separated from the catch 19;
- a mechanism 20 for blocking the bolt in locking position, connected to the control unit 9 and controlled by it.

The locking system 17 comprises, moreover, a proximity sensor or, as in the example illustrated in FIG. 5, a switch 21, mounted on the casing 14 and connected to the control unit 9.

The installation 1 comprises numerous door leaves 15 that are distributed to make possible access that is as easy as possible to its various components, so as to facilitate maintenance at a complete stop. Thus, as illustrated in FIG. 2, the covering 10 comprises door leaves 15 placed:
- in line with the treatment units 4,
- in line with the transfer system 7,
- at least one interface between the transfer system 7 and at least one of the treatment units 4.

In this installation 1, at least one of the treatment units 4 is auxiliary and can be disengaged from the transfer system 7; that is to say that this treatment unit 4 can be stopped even when the rest of the line 1 (i.e., the other treatment units 4 and the transfer system 7) remains in operation.

In the example illustrated, the auxiliary treatment unit 4 is the plasma treatment unit 4C. It is seen that the installation 1 comprises a device 22 for coupling the auxiliary treatment unit 4C to the transfer system 7.

In the example illustrated, this coupling device 22 comprises an input wheel 23 and an output wheel 24, both of which are inserted between the carousel 5 and the transfer system 7 and ensuring respectively:
- the collecting, on the transfer system 7, of the formed containers 3, and their introduction into the auxiliary treatment unit 4C;
- the ejection of the treated containers 3 from the auxiliary treatment unit 4C and their re-introduction into the transfer system 7.

As is seen in FIG. 2, the coupling device 22 comprises a mechanism 25 for synchronous driving of the input wheel 23 and of the output wheel 24, here in the form of a belt or of a chain that circulates, on the one hand, over driven pinions carried by the wheels and, on the other hand, over a driving pulley that is integral with a motor.

The stopping of the auxiliary treatment unit 4C can be accomplished by the cut-off of the power supply to its drive system (typically an electric motor). In this case, the auxiliary treatment unit 4C is disengaged from the transfer system 7 by deactivation of the coupling device 22. For this purpose, it can be separated (for example by a vertical translational movement) from the transfer system 7, so as to disengage the input wheels 23 and the output wheels 24 from the transfer wheels 8. In this case, the hollow bodies 2, 3 no longer pass by the auxiliary treatment unit 4C but short-circuit it by following their path via a bypass wheel 26 ensuring the interface between the portion of the transfer system 7 located upstream from the auxiliary treatment unit 4C and the portion located downstream.

As is seen in FIG. 2, at least one door leaf 15P, called main door leaf 15P, is provided in line with the auxiliary treatment unit 4C at a distance from the transfer system 7.

As is seen in FIG. 2, at least one door leaf 15L, called bordering door leaf 15L, is, moreover, provided in the vicinity of an interface 27 between the auxiliary treatment unit 4C and the transfer system 7. In practice, in the example illustrated, at least two bordering door leaves 15L are provided on both sides of the treatment unit 4C, in the vicinity of its upstream and downstream interfaces 27 with the transfer system 7.

To avoid any risk of injury to an operator dispatched to intervene on the stopped auxiliary treatment unit 4C while the rest of the line 1 (and in particular the transfer system 7) remains in operation, it is selected to prohibit access for him to it through the bordering door leaves 15L.

To achieve this, the control unit 9 detects the stopping of a treatment unit 4 (here, the auxiliary treatment unit 4C).

The control unit 9 also detects the operation of the transfer system 7. This detection can be performed by means of movement sensors on at least one of the transfer wheels 8, or by control of the movement of a drive motor of the transfer system 7.

The control unit 9 then detects the closed position of the bordering door leaf 15L (or of the bordering door leaves 15L) of the detected treatment unit 4 that is stopped.

In practice, this detection is performed via the switch 21 (or the proximity sensor) mounted on the casing 14.

Then, if this door leaf 15L (or these door leaves 15L) is detected (are detected) in closed position, the control unit 9 orders the locking of this door leaf 15L (or of these door leaves 15L) in closed position.

In practice, the control unit 9 guides the mechanism 20 for blocking the bolt in locking position to keep it hooked with the catch 19 carried by the door leaf 15L.

To warn personnel of the locking of any door leaf 15 (and more particularly of any bordering door leaf 15L) in closed position, the control unit 9 can be programmed to generate a locking alert signal. This alert signal is manifested, for example, by the lighting of an indicator light in the vicinity of the door leaf 15L that is locked in closed position. This indicator can be carried by the door leaf 15L itself (for example on the handle 16) or mounted on the casing 14.

Access through the main door leaf 15P (or the main door leaves 15P) must, however, remain possible.

To achieve this, the control unit 9 is advantageously programmed to verify if any main door leaf 15P of the detected treatment unit 4 that is stopped is open or closed (via its switch 21) and, in the case where the main door leaf 15P is detected in closed position, to verify if it is locked in this position. In this case, the control unit 9 is programmed to unlock the door leaf 15P, so as to make possible its opening and access to the treatment unit 4C.

As a result of the locking of the bordering door leaves 15L, the operators are no longer tempted to intervene on a stopped treatment unit 4 in the dangerous zones for interfacing with the transfer system 7 when it has remained in operation.

The result is an improved securing of the means of access to the line 1, and in particular the possibility of intervening without risk on a stopped treatment unit 4 even when the rest of the line 1 (and in particular the transfer system 7) remains in operation.

The invention claimed is:

1. Method for controlling an installation (1) for handling hollow bodies (2, 3), which comprises:
    a plurality of treatment units (4) for treating hollow bodies (2, 3);
    a system (7) for transferring hollow bodies (2, 3) between the treatment units (4);
    a covering (10) that defines a closed chamber (11) in which the treatment units (4) and the transfer system (7) are housed, this covering (10) comprising:
        a frame (12) that defines casings (14);
        door leaves each mounted on a casing (14) between an open position in which the door leaf provides access to the chamber (11) from the outside, and a closed position in which the door leaf prohibits access to the chamber (11) from the outside;
        for each door leaf, a system (17) for locking the door leaf in closed position;
    a computer (9);
    the method comprising the following operations:
        determining, by the computer (9), stopping of a treatment unit (4C) has occurred;
        determining, by the computer (9), a closed position of door leaves (15L) located adjacent an interface (27) between the detected treatment unit (4C) that is stopped and the transfer system (7);
        determining, by the computer (9), the transfer system (7) is in operation after the stopping of the treatment unit (4C); and
        sending, by the computer (9), a communication to lock the door leaves (15L) when the control unit (9) determines the door leaves (15L) are in a closed position and the transfer system (7) is in operation.

2. Method according to claim 1, further comprising the following operation:
    sending, by the computer (9), a communication to unlock main door leaves (15P) that are at a distance from an interface (27) with the transfer system (7) where at least one door leaf (15L) is located in line with the detected treatment unit (4C) that is stopped and is detected as being in a closed position and locked.

3. Method according to claim 1, further comprising the following operation:
    generating a locking alert signal for any locked door leaf (15L).

4. Method according to claim 3, wherein the alert signal is manifested by the lighting of an indicator light in the vicinity of the door leaf (15L) that is locked in closed position.

5. Method according to claim 2, further comprising the following operation:
    generating a locking alert signal for any locked door leaf (15L).

6. Method (1) according to claim 1, wherein the computer (9) determines operation of the transfer system (7) by detecting movement on at least one transfer wheel (8).

7. A computer (9) for operation with an installation (1), wherein the installation (1) comprises:
    a plurality of treatment units (4) for treating hollow bodies (2, 3);
    a system (7) for transferring hollow bodies (2, 3) between the treatment units (4);
    a covering (10) that defines a closed chamber (11) in which the treatment units (4) and the transfer system (7) are housed, this covering (10) comprising:
        a frame (12) that defines casings (14);
        door leaves each mounted on a casing (14) between an open position in which the door leaf provides access to the chamber (11) from the outside, and a closed position in which the door leaf prohibits access to the chamber (11) from the outside;
        for each door leaf, a system (17) for locking the door leaf in closed position;
    wherein the computer (9) is programmed to:
        determine stopping of a treatment unit (4C);
        determine closed position of door leaves (15L) located adjacent an interface between the detected treatment unit (4C) that is stopped and the transfer system (7);
        determine the transfer system (7) is in operation after the stopping of the treatment unit (4C); and
        send a communication to lock the door leaves (15L) when the computer determines the door leaves (15L) are in a closed position and the transfer system (7) is in operation.

8. The computer (9) according to claim 7, wherein the locking system (17) comprises a switch (21) or a proximity sensor mounted on the casing (14) and connected to the control unit (9).

9. The computer (9) according to claim 7, wherein the locking system (17) comprises an electromechanical lock (18) mounted on the casing (14) and including:
    a bolt that can be moved between a locking position in which it works with a catch (19) carried by the door leaf (14), and a release position in which it is separated from the catch (19);
    a mechanism (20) for blocking the bolt in locking position, connected to the computer (9) and ordered by it.

10. The computer (9) according to claim 8, wherein the locking system (17) comprises an electromechanical lock (18) mounted on the casing (14) and including:

a bolt that can be moved between a locking position in which it works with a catch (19) carried by the door leaf (14), and a release position in which it is separated from the catch (19);

a mechanism (20) for blocking the bolt in locking position, connected to the computer (9) and ordered by it.

11. The computer (9) according to claim 7, wherein the computer (9) determines operation of the transfer system (7) by detecting movement on at least one transfer wheel (8).

* * * * *